(12) United States Patent
Eckert et al.

(10) Patent No.: US 10,684,930 B2
(45) Date of Patent: Jun. 16, 2020

(54) FUNCTIONAL TESTING OF HIGH-SPEED SERIAL LINKS

(71) Applicant: International Business Machines Corporation, Armonk, NY (US)

(72) Inventors: Martin Eckert, Moetzingen (DE);
Thomas Gentner, Boeblingen (DE);
Marta Junginger, Altdorf (DE);
Eckhard Kunigkeit, Stuttgart (DE);
Matthias Pflanz, Holzgerlingen (DE);
Quintino Lorenzo Trianni, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 15/827,470

(22) Filed: Nov. 30, 2017

(65) Prior Publication Data

US 2019/0163596 A1    May 30, 2019

(51) Int. Cl.
*G06F 11/00* (2006.01)
*G06F 11/277* (2006.01)
(Continued)

(52) U.S. Cl.
CPC .......... *G06F 11/277* (2013.01); *G06F 11/221* (2013.01); *G06F 11/273* (2013.01)

(58) Field of Classification Search
CPC ............................... G06F 11/27; G06F 11/273
(Continued)

(56) References Cited

U.S. PATENT DOCUMENTS 6,289,477 B1 * 9/2001 Gunadisastra .............................. G01R 31/318541
324/750.3
7,536,267 B2    5/2009 Zimmerman
(Continued)

FOREIGN PATENT DOCUMENTS

DE            60315059 T2       8/2007

OTHER PUBLICATIONS

Gyu-Yeol Kim, et al., "Novel TDR Test Method for Diagnosis of Interconnect Failures Using Automatic Test Equipment", http://ieeexplore.ieee.org/document/7961210, IEEE Transactions on Instrumentation and Measurement, vol. PP, Issue: 99, Jun. 28, 2017, pp. 1-9.

(Continued)

*Primary Examiner* — Sarai E Butler
(74) *Attorney, Agent, or Firm* — Cantor Colburn LLP; Margaret McNamara

(57) ABSTRACT

A functional testing high-speed serial link system includes a testing controller that generates a functional testing program, and a device under test (DUT) that receives the functional testing program. The DUT includes a first logic circuit array that generates first results in response to executing the functional test program. The system also includes a supporting chip that receives the functional testing program. The supporting chip includes a second logic circuit array that generates second results in response to executing the functional test program. A physical data link establishes signal communication between the DUT and the supporting chip. The testing controller diagnoses the physical link based on a comparison between expected diagnostic results associated with the functional testing program, and at least one of the first results and the second results.

20 Claims, 5 Drawing Sheets

(51) Int. Cl.
*G06F 11/22* (2006.01)
*G06F 11/273* (2006.01)

(58) Field of Classification Search
USPC .......................................................... 714/30
See application file for complete search history.

(56) References Cited

U.S. PATENT DOCUMENTS

| | | |
|---|---|---|
| 8,531,202 B2 | 9/2013 | Mok |
| 2006/0043983 A1 | 3/2006 | Setaka et al. |
| 2009/0140755 A1* | 6/2009 | Byers .................. H04B 10/803 |
| | | 324/763.01 |
| 2009/0201038 A1 | 8/2009 | Knickerbocker |
| 2010/0213965 A1 | 8/2010 | Chen |
| 2010/0313089 A1* | 12/2010 | Rajski ............ G01R 31/318547 |
| | | 714/731 |
| 2012/0253731 A1 | 10/2012 | Akdemir |
| 2014/0300379 A1 | 10/2014 | Ryckaert |
| 2014/0351664 A1 | 11/2014 | Akdemir |
| 2015/0067426 A1* | 3/2015 | Nardini .......... G01R 31/318547 |
| | | 714/727 |
| 2015/0220065 A1* | 8/2015 | Suma Vinay ......... G04F 10/105 |
| | | 341/166 |
| 2015/0355278 A1 | 12/2015 | Shetty |
| 2016/0196197 A1* | 7/2016 | Hamid ............... G01R 31/3177 |
| | | 714/33 |
| 2018/0156868 A1* | 6/2018 | Batz ................... G01R 31/3172 |
| 2018/0188321 A1* | 7/2018 | Pappu ................ G06F 11/3648 |

OTHER PUBLICATIONS

Mottaqiallah Taouil, et al., "Interconnect Test for 3D Stacked Memory-On-Logic", Delft University of Technology, Faculty of EE, Mathematics and CS, Mekelweg 4, 2628 CD Delft, The Netherlands, 978-3-9815370-2-4/ DATE14/c 2014 EDAA; 6 pages.
Ran Wang, et al., "At-speed interconnect testing and test-path optimization for 2.5D ICs", http://ieeexplore.ieee.org/abstract/document/6818770, VLSI Test Symposium (VTS), 2014 IEEE 32nd, Apr. 13-17, 2014, 3 pages.

* cited by examiner

FUNCTIONAL TESTING OF HIGH-SPEED SERIAL LINKS

BACKGROUND

The present disclosure relates generally to chip manufacturing, and more particularly, to methods, systems and computer program products for performing functional testing of high-speed serial links. High-speed interconnect testing on wafers or module test environments are performed to improve product yield, testing time, and overall cost efficiency. Ensuring reliable high-speed interfaces requires intensive testing of the chip wafer or in the module test environment (i.e., at the module level).

SUMMARY

Embodiments of the present invention are directed to a method for performing functional testing of high-speed serial links. A non-limiting example of the computer-implemented method includes a method for performing functional testing of high-speed serial links. The method comprises generating a functional testing program to be executed by a logic circuit array, and connecting a device under test (DUT) to an electronic supporting chip via a physical interface. The method further includes outputting the function testing program to the DUT that includes a first logic circuit array, and generating first results, via the DUT, in response to executing the functional test program by the first logic array. The method further includes outputting the function testing program to the electronic supporting chip that includes a second logic circuit array, and generating second results, via the electronic supporting chip, in response to executing the functional test program by the second logic array. The method further includes diagnosing a physical link based on a comparison between expected diagnostic results associated with the functional testing program, and at least one of the first results and the second results.

Embodiments of the present invention are directed to a functional testing high-speed serial link system. A non-limiting example of the system includes a testing controller configured to generate a functional testing program, and a device under test (DUT) in signal communication with the testing controller to receive the functional testing program. The DUT includes a first logic circuit array that generates first results in response to executing the functional test program. An electronic supporting chip is in signal communication with the test controller to receive the functional testing program. The electronic supporting chip includes a second logic circuit array that generates second results in response to executing the functional test program. A physical data link establishes signal communication between the DUT and the electronic supporting chip. The testing controller diagnoses the physical link based on a comparison between expected diagnostic results associated with the functional testing program, and at least one of the first results and the second results.

Embodiments of the invention are directed to a computer program product for performing functional testing of high-speed serial links. The computer program product comprises a computer readable storage medium having program instructions embodied therewith. The program instructions are executable by a processor to cause the processor to perform a method. A non-limiting example of the method includes generating a functional testing program to be executed by a logic circuit array, and connecting a device under test (DUT) to an electronic supporting chip via a

[Col. 2]

physical interface. The method further includes outputting the function testing program to the device under test (DUT) that includes a first logic circuit array, and generating first results, via the DUT, in response to executing the functional test program by the first logic array. The method further includes outputting the function testing program to the electronic supporting chip that includes a second logic circuit array, and generating second results, via the electronic supporting chip, in response to executing the functional test program by the second logic array. The method further includes diagnosing a physical link based on a comparison between expected diagnostic results associated with the functional testing program, and at least one of the first results and the second results.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
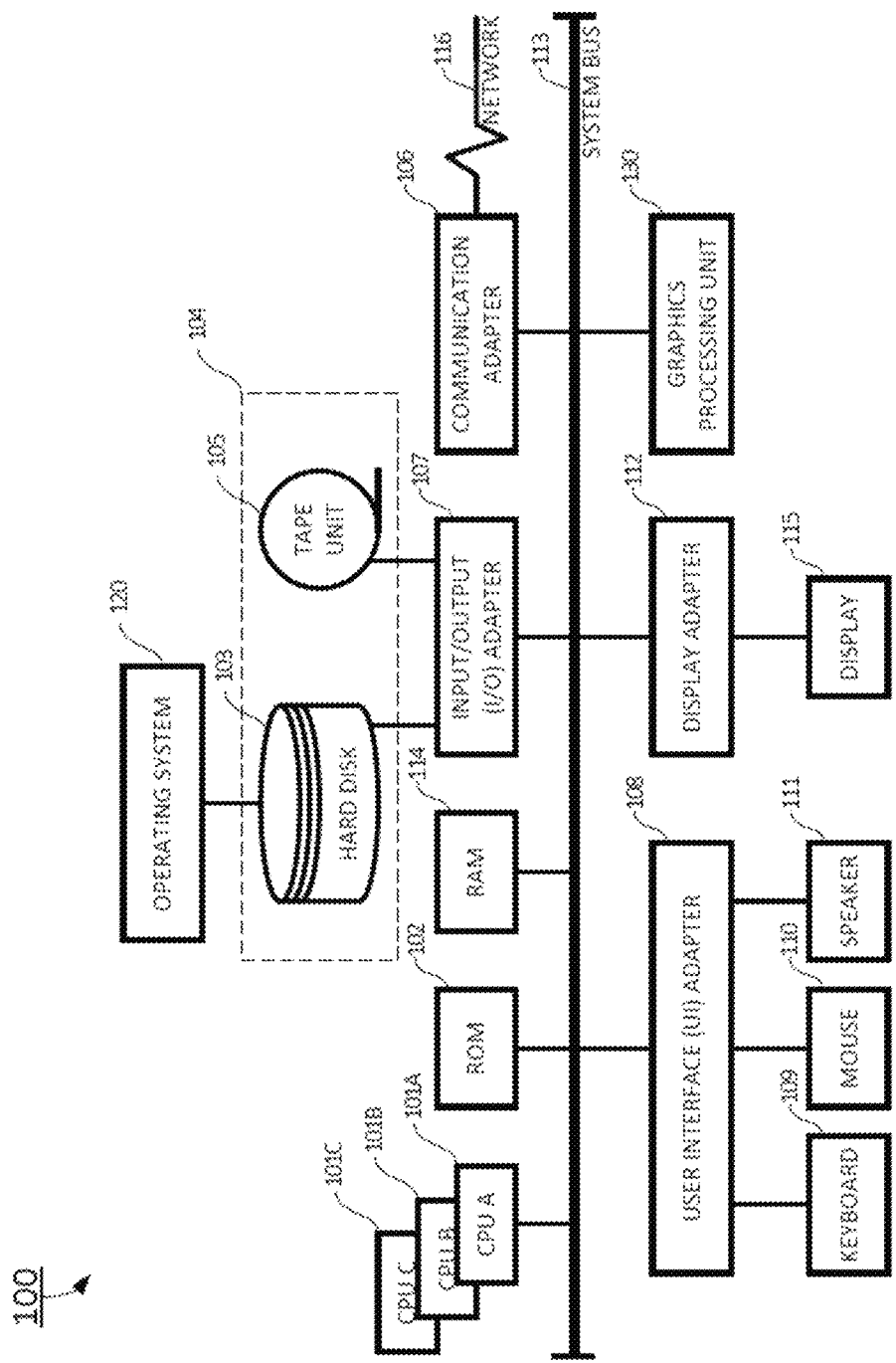
FIG. 1 is a block diagram illustrating a computer system capable of controlling a functional testing high-speed serial link system according to a non-limiting embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, Generalized Scan Design (GSD)-based testing has been attempted to test serial interfaces in the past. A typical GSD testing operation scans in a series of binary "1" and "0" bits to transition between states of latches included in the scan chain. However, conventional GSD-based testing techniques result in a residual amount of untested behavior that cannot be verified with traditional scan test methods. Another technique for testing high-speed interfaces is to vary or change the wafer test level into a purely functional test. However, changing the wafer level prevents the identification of classic failure types such as, for example, static faults or analog current (AC) test fails. Traditional test systems also incapable of processing the high-speed data delivered to the outputs. Consequently, technicians are forced to obtain specific high-speed testing systems such as a bit-error rate tester (BERT) or PCIe channel tester, for example, which are dedicated to handling the high-speed output of a particular chip design. These dedicated testing systems, however, merely indicate the presence of error detected in an unknown area of the chip, and are also incapable of synchronously starting or stopping their respective test prior to completing the full test run.

Turning now to an overview of the aspects of the invention, one or more embodiments of the invention address the above-described shortcomings of the prior art by providing a functional testing high-speed serial link system capable of properly testing and diagnosing high-speed serial link failures, even in environments having an independent endpoint connected to the device under test (DUT). The functional testing high-speed serial link system electrically integrates a DUT with a computing supporting chip via a physical data link to form a single virtual chip. In this manner, test patterns can effectively be generated for a single integrated chip that also includes the endpoint. In addition, because the single virtual chip includes to independent physical chips, independent testing operations (e.g. start, stop, scan, etc.) can control each physical chip (i.e., the supporting chip and the DUT) independently of one another. Accordingly, the individual physical chips can be independently operated, but synchronously controlled to perform start/stop failure diagnostic operations at both ends of the physical link.

With reference to FIG. 1, a computer system 100 capable of controlling a functional testing high-speed serial link system is illustrated according to a non-limiting embodiment. The computer system 100 has one or more central processing units (processors) 101A, 101B, 101C, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of the computer system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the computer system 100 may be stored in mass storage 104.

A network adapter 106 interconnects bus 113 with an outside network 116 enabling the computer system 100 to communicate with other such systems. A screen (e.g., a display monitor) 115 is connected to system bus 113 by display adaptor 112, which may include a graphics adapter to improve the performance of graphics intensive applications and a video controller. In at least one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the computer system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 1, the computer system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 1. In certain embodiments, the network 116 may include symmetric multiprocessing (SMP) bus, a Peripheral Component Interconnect (PCI) bus, local area network (LAN), wide area network (WAN), telecommunication network, wireless communication network, and the Internet.

Figure 2:
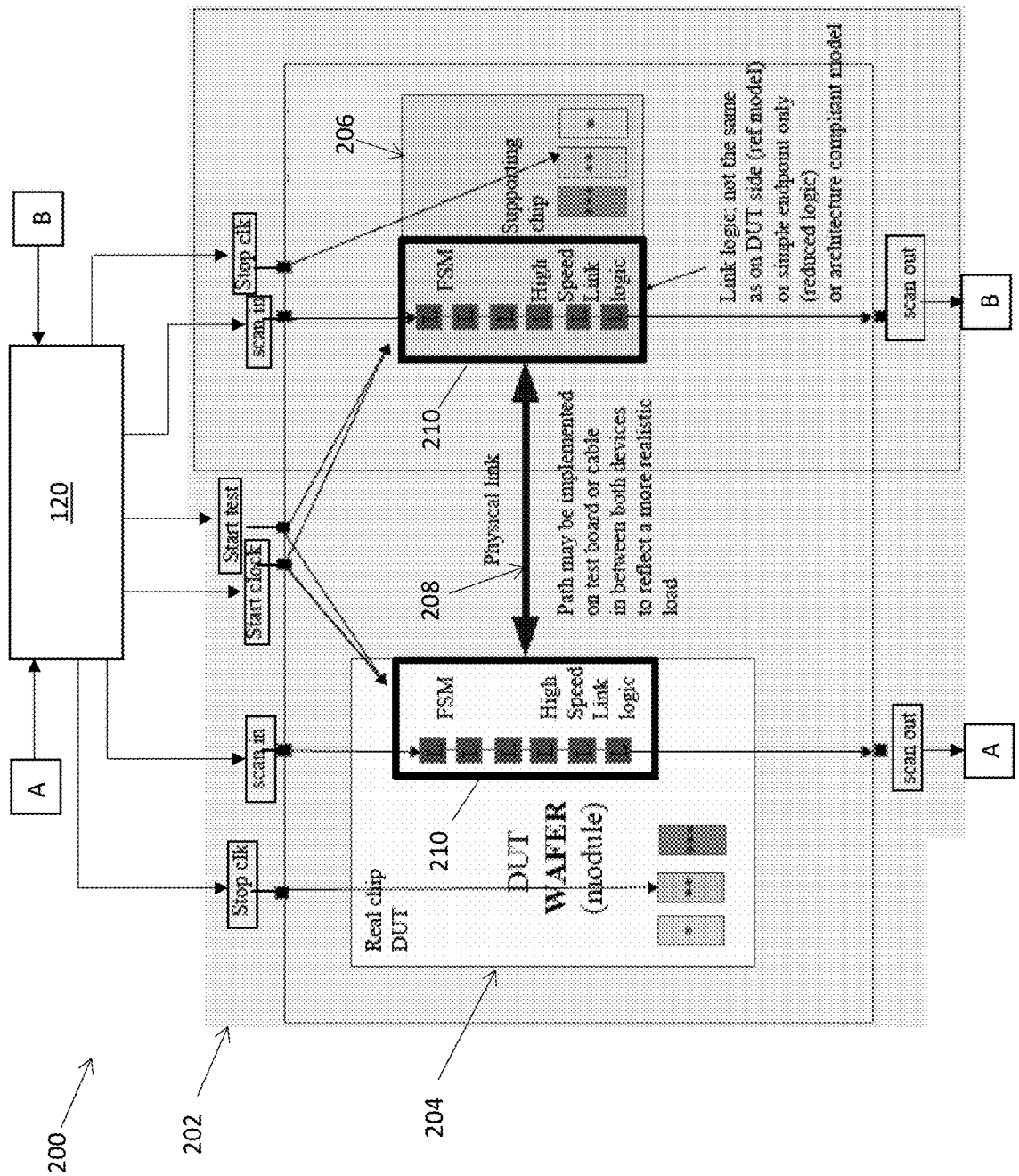
FIG. 2 is a block diagram of a functional testing high-speed serial link system capable of performing functional testing of high-speed serial interfaces according to a non-limiting embodiment.

Referring now to FIG. 2, a functional testing high-speed serial link system 200 capable of performing functional testing of high-speed serial interfaces is illustrated according to a non-limiting embodiment. The functional testing high-speed serial link system 200 includes a virtual chip 202 in signal communication with an electronic hardware controller 120, hereinafter referring to as a testing controller 120. The testing controller 120 outputs various control signal signals such as, for example, a start clock signal, a start test signal, a stop clock signal, a stop test signal, and one or more input scan test signals. The testing controller 120 also receives output scan signals from the virtual chip 202. Accordingly, the testing controller 120 can execute various testing operations on the virtual chip 202, and analyze the results to detect and diagnose serial link failures.

The virtual chip 202 includes an electronic DUT 204 electrically coupled with an electronic supporting chip 206 via a physical data link 208. Accordingly, the supporting chip 206 can serve as a communications partner with the DUT 204. The DUT 204 and/or the supporting chip 206 can be constructed as an individual electronic hardware controller that includes memory and a processor configured to execute algorithms and computer-readable program instructions stored in the memory. For example, the supporting chip 206 can be constructed as a field programmable gate array, an ASIC, or any other computing endpoint capable of supporting the interface under test while also providing operational compatibility with scan tests such as, for example, level-sensitive scan design (LSSD)-based test methods.

The DUT 204 is in signal communication with the testing controller 120 to receive various command signals including, but not limited to, a scan-in signal, a start clock signal, and a stop clock signal. The scan-in signal delivers a DUT test pattern to the DUT 204. The DUT test pattern can include various testing operations including, but not limited to, a load operation, an unload operation, mode selection signal, or any high-speed logic operation corresponding to GSD-based techniques. The start clock signal invokes execution of the test upon the DUT 204. The stop clock signal halts the clock signal and can be output at any time during the test to halt the test at its current state. Increment and/or decrement signals can also be delivered from the testing controller 120 to the DUT 204, which increments or decrements the clock cycle from its halted position. In this manner, the testing controller 120 can adjust the DUT clock independently from the SC clock to narrow the location of a detected fault associated with the DUT 204 during the test.

The DUT 204 includes one or more finite state machines (FSMs) 210 in signal communication with the testing controller 120. The FSM 210 operates according to DUT high-speed link logic or logic circuit array, which can include various registers and logic elements designed to operate on the DUT 204. For example, the FSM 210 can establish a counting process based on inputs obtained from one or more registers. A logic element can be provided to access a data bus, which can be connected to a register infrastructure of the DUT 204. The data bus can deliver information and/or command signals to various elements of the FSM 210 such as, for example, a duration register, a counter control register, and a mask register. Duration information obtained from the duration register is fed to the counter control logic, whereas different command signals such as, for example, a mode selection signal, a load counter signal, a reset increment signal, and a run/stop signal are fed from the counter control register to the counter control logic. The FSM 210 can also receive a clock increment signal, clock decrement signal, and/or a reset increment signal from the testing controller 120. The clock signal can be used to synchronizes a skitter circuit and one or more counters. The clock signal can also be utilized to control increments of the counting process, whereas the reset increment signal can be fed to the counter circuits.

The various registers and elements of the DUT high-speed link logic described above work in conjunction such that the FSM 210 can perform a test exercise, e.g., various functional testing computations to test the DUT 204, in response to receiving a DUT scan test signal from the testing controller 120. The results of the testing exercise are output from the FSM 210 as DUT output scan signals (indicated as signal A), which are analyzed by the testing controller 120.

The supporting chip 206 established a real endpoint for the DUT 204, thereby providing more accurate diagnostics that are more comparable with expected operational behavior and that provide more precise control of internal logic. Thus, the supporting chip 206 establishes a real end-to-end path in the test environment which can be tested and controlled in the same way as the DUT 204.

In at least one embodiment, the supporting chip 206 is in signal communication with the testing controller 120 to receive various command signals including, but not limited to, a scan-in signal, a start clock signal, and a stop clock signal. The scan-in signal delivers an SC supporting chip (SC) test pattern to the supporting chip 206. The SC test pattern can include various testing operations including, but not limited to, a load operation, an unload operation, mode selection signal, or any high-speed logic operation corresponding to GSD-based techniques. The start clock signal invokes execution of the test upon the supporting chip 206. The stop clock signal halts the clock signal and can be output at any time during test to halt the test at its current state. Increment and/or decrement signals can also be delivered from the testing controller 120 to the supporting chip 206, which increments or decrements the clock cycle from its halted position. In this manner, the testing controller 120 can adjust the SC clock independently from the DUT clock to narrow the location of a detected fault associated with the supporting chip 206 during the test.

The supporting chip 206 includes a link engine (not shown) and one or more supporting FSMs 210. The link engine operates to identify and process the physical link to the DUT 204. The supporting FSM 210 is in signal communication with the testing controller 120 and operates according to supporting chip (SC) high-speed link logic, which can include various registers and logic elements designed to operate on the supporting chip 206. The registers and logic elements of SC high-speed link logic work in conjunction (similar to the DUT high-speed link logic described above) to perform an SC test exercise, e.g., various functional testing computations to test the supporting chip, in response to receiving an SC scan test signal from the testing controller 120. The results of the testing exercise are output from the FSM 210 as SC output scan signals (indicated as signal B), which are analyzed by the testing controller 120.

The physical data link 208 includes a first end connected to the DUT 204 and a second end connected to the supporting chip 206. In this manner, the physical data link electrically couples together the DUT 204 and the supporting chip 206 to effectively establish the virtual chip 202. The physical data link 208 can include one or more physical connections (e.g., physical data paths, cables, conductive wires, etc.) that establish a high-speed physical serial data link capable of exchanging data between the DUT 204 and the supporting chip 206. The physical data link 208 also applies a load upon the DUT 204 and the supporting chip 206 which can be monitored and diagnosed. In at least one embodiment, the physical data link 208 connects the output of the DUT 204 to an input of the supporting chip 206. In this manner, the supporting chip 206 can serve as an end-point for the DUT 204 such that the performance of the physical link 208 can be monitored and diagnosed.

The physical link 208 bridges the DUT 204 with the supporting chip to provide the DUT 204 with an independent data endpoint. In this manner, the system can test and properly diagnose the link layer failures associated with the physical link 208. That is, the physical link 208 can support the diagnostics portion of the tests involving the DUT 204 and the supporting chip 206. In addition, both endpoints (i.e., the DUT 204 and the supporting chip 206) can be synchronously controlled for a functional link setup and link up event.

In at least one embodiment, the functional testing high-speed serial link system 200 can perform separate functional start/stop operations, scan operations, and clock operations, which can be independently operated but synchronously controlled, if necessary. The ability to synchronously and/or independently perform various separate testing operations allows the functional testing high-speed serial link system 200 to execute link-related functional tests iteratively, while actively halting the clock (i.e., without requiring a given test run to fully complete) in order to identify a failing cycle for the DUT 204 and/or the supporting chip 206. For instance, the clock can be halted upon detecting unexpected results of given clock cycle. The clock can then be incremented and/or decremented to identify the precise location of the fault contained in a particular clock cycle. Further, the ability to actively halt the driving clock signal during the execution of the test run allows the testing controller 120 to accurately diagnose the cause of the failing cycle for the link-side associated with the DUT 204 and/or the cause of the failing cycle for the link-side associated with the supporting chip 206.

Figure 3:
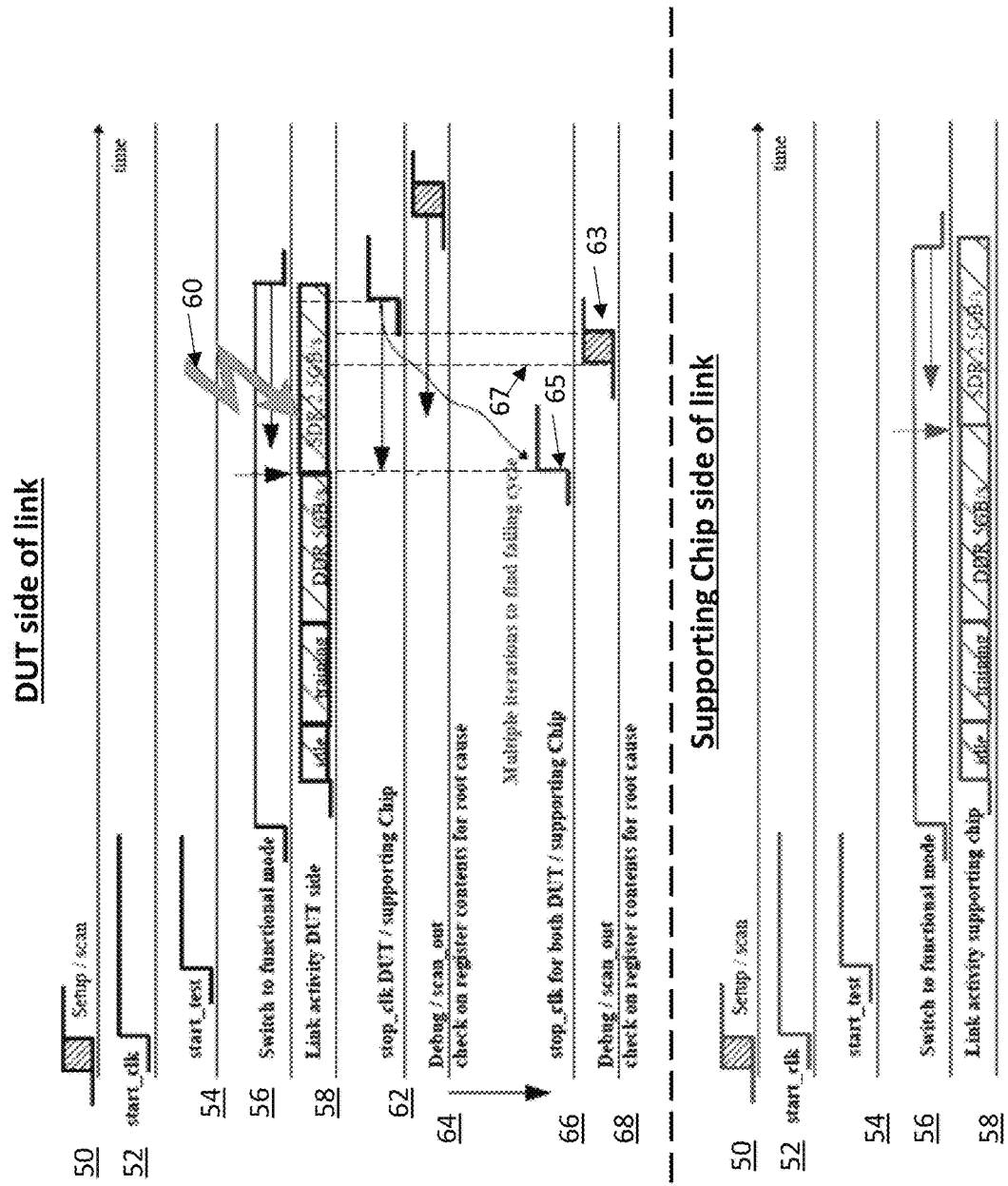
FIG. 3 depicts a virtual chip configured to generate test patterns for functional testing of high-speed serial links according to a non-limiting embodiment.

An example of a logic view and timing diagram generated in response to performing functional testing of a high-speed serial link is illustrated in FIG. 3. At operation 50, the DUT 204 and supporting chip 206 are setup and a preliminary scan (e.g., a GSD scan) can be performed to determine that the DUT 204 and the supporting chip are still functional. The clock signal command (start_clk) is delivered to both the DUT 204 and supporting chip 206 at operation 54, and the test (start_test) is initiated at the rising clock edge shown at operation 54. The DUT 204 and the supporting chip 206 are transitioned from a testing mode to a function mode at the rising edge of the clock illustrated in operation 56, and the activity of the serial link at the DUT end and the supporting end is monitored at operation 58. The serial link activity can include, for example, idle time activity, training activity, double data rate (DDR) data exchanges on the physical link, and single data rate (SDR) data exchanges on the physical link.

Turning to operation 62, the stop clock signal is output to both the DUT 204 and the supporting chip 206 following detection of a faulty clock cycle 60. The faulty clock cycle in this example contains a fault 63 in the clock cycle of associated with the SDR link activity. The results of the SDR link activity are scanned out at operation 64, and the clock cycle is decremented to the beginning of the SDR clock cycle 65 at operation 66.

At operation 66, the test is run again starting from the beginning of the SDR link clock cycle 65, where the fault 63 is again detected and the results are scanned out at operation 68. The clock cycle can be again decremented to a point near the leading edge 67 of the detected fault 63, where its location in the SDR link activity can be identified and stored in a register for further analysis.

Figure 4:
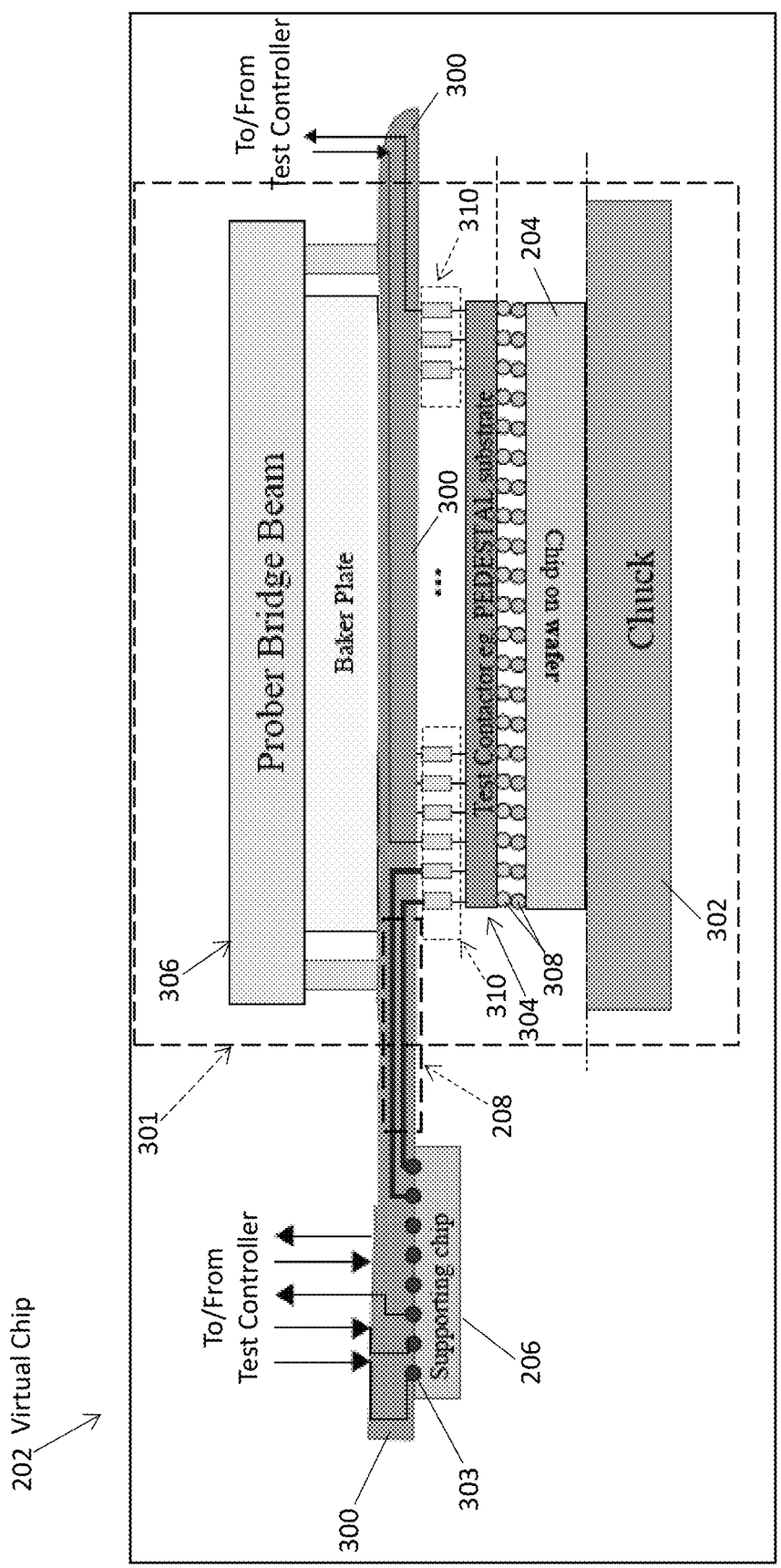
FIG. 4 is a logic view and timing diagram generated in response to performing functional testing of high-speed serial links according to a non-limiting embodiment.

Turning to FIG. 4, a virtual chip 202 configured to generate test patterns for functional testing of high-speed serial links is illustrated according to a non-limiting embodiment. As described above, the virtual chip 202 includes a DUT 204 electrically coupled with a supporting chip 206. In the example illustrated in FIG. 4, the DUT 204 and the supporting chip 206 are installed on a shared test board 300. The DUT 204 is electrically connected to the test board via a DUT assembly 301. The supporting chip 206 is also electrically connected to the test board 300 via a plurality of electrically conductive board contacts 303.

The test board 300 is also configured to establish signal communication with the testing controller 120. For example, the board contacts 303 can serve as inputs and outputs for exchanging data between the testing controller 120 and the supporting chip 206. The testing board 300 can also include separate terminals for exchanging data between the testing controller 120 and the DUT 204.

The DUT assembly 301 includes a chuck 302, a pedestal substrate 304, and a mechanical stabilizing metal block, sometimes referred to as a bridge beam 306. The bridge beam 306 serves as a counter support for the mechanical forces (e.g., 150 kilograms of force) induced when pressing the DUT 204 on to the chuck 302 and towards the test board 300. The chuck 302 is typically a temperature controlled element. The chuck 302 serves a support stage and includes an upper surface that supports the DUT 204 thereon. The chuck 302 can be formed of any material capable of supporting the DUT 204. The chuck 302 can also serve as a temperature controlling element. For example, heat dissipated in response to powering (e.g., 100 Watts) the DUT 204 during a testing procedure can be consumed or thermally absorbed by the chuck 302.

The pedestal substrate 304 serves as a testing contactor or electrical interface between the test board 300 and the DUT 204. A first end of the pedestal substrate 304 includes a plurality of electrically conductive contacts 308 such as solder balls or conductive pads. An opposing end of the pedestal substrate 304 includes a plurality of interposer terminals 310. Opposing ends of the conductive contacts 308 are connected to the DUT 204, while opposing ends of the interposer terminals 310 are connected to the test board 300. Accordingly, the pedestal substrate 304 can establish signal communication between the DUT 204 and the test board 300. Although a single pedestal substrate 304 is illustrated, another embodiment can include a plurality of pedestal substrate. For example, a first pedestal substrate can include electrical connections dedicated to functional test operations, while a second pedestal substrate can include connections for remaining control operations.

The bridge beam 306 is composed of one or more mechanically elements (e.g., a baker plate), and is disposed in physical contact with the test board 300. The bridge beam 306 serves as a mechanical support that reduce or completely prevents deformation (e.g., bowing) of the test board 300.

As described above, the DUT 204 is electrically coupled together with the supporting chip 206 via physical data link 208. In at least one embodiment, the physical link 208 is integrally formed on the test board 300. A first end of the physical link 208 is connected to the supporting chip via one or more of the board connectors 303. The opposing end of the physical link 208 is connected to one or more interposer terminals, which in turn establish electrical communication with the DUT 204 via the pedestal substrate 304. Although a physical link 208 integrated with a single test board 300 is described, it should be appreciated that the physical link can be established using an electrically conductive cable or wires that connect the DUT 204 installed on a first test board with a supporting chip 206 installed on a separate and different test board.

Figure 5:
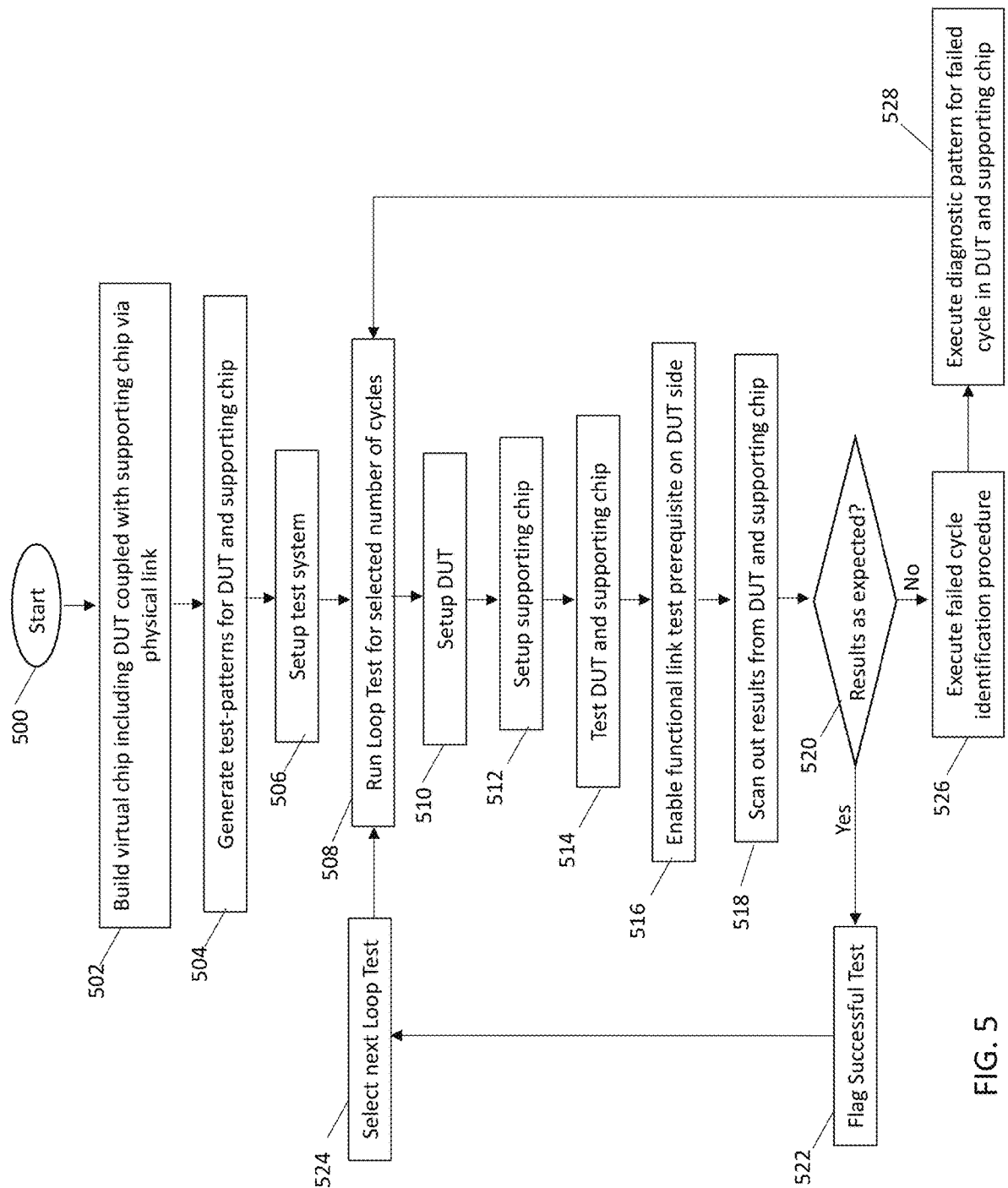
FIG. 5 is a flow diagram illustrating a method of performing functional testing of high-speed serial links according to a non-limiting embodiment.

Turning now to FIG. 5, a flow diagram illustrates a method for performing functional testing of high-speed serial links according to a non-limiting embodiment. The method begins at operation 500, and at operation 502 a virtual chip is built. The virtual chip includes a DUT electrically coupled to a supporting chip via a physical data link. In at least one embodiment, the DUT and supporting chip can be installed on a single test board, and electrically coupled together by one or more electrically conductive traces (i.e., a physical data link) formed on the board. In at least one embodiment, the DUT and the supporting chip can be installed on separate and independent testing boards. An electrically conductive cable, wires, etc., can be utilized to establish the data. For example, a first end of the cable is connected to the DUT, while an opposing second end of the cable is connected to the supporting chip.

At operation 504, a first test pattern is generated for the DUT and a second test pattern is generated for the supporting chip. The test pattern can include various testing operations including, but not limited to, a load operation, an unload operation, mode selection signal, or any high-speed logic operation corresponding to GSD-based techniques. At operation 506, the test system is setup, and a loop test is executed for a selected number of cycles at operation 508. The loop test involves setting up the entire test starting from the beginning to ensure state correct reactivation of the DUT and the supporting chip. Accordingly, the best possible reproduction of the previous fail situation can be achieved, while stopping at another test cycle. At operation 510, the DUT is loaded with the DUT test pattern and the DUT is setup for testing. Similarly, at operation 512 the supporting chip is setup for testing. At operation 514, GSD tests including the generated test patterns are executed on the supporting chip and/or the DUT. The GSD tests determine whether the DUT and the supporting chip are functional and credible. At operation 516, a functional link test prerequisite is enabled at the DUT-end of the physical link, and the initial loop test is executed. The testing system can select the number of iterations to run the loop test. In at least one embodiment, the loop test includes applying a dedicated Automatic Test Pattern Generation (ATPG) pattern to the DUT and/or the supporting chip. The ATPG pattern can invoke functional link training of the physical link undergoing the current test. The ATPG pattern can also transition the DUT and/or the supporting chip to cycle through their respective logic states to confirm proper functionality.

Turning to operation 518, the test results output from the supporting chip and/or the DUT in response to the current loop test are obtained and analyzed. When expected results are determined at operation 518, the previous loop test is flagged as a successful loop test at operation 522. The results can be deemed "expected" by comparing the test results obtained in response to current loop test to known expected results obtained from previous bench tests or comparing to simulation results. At operation 524, the next loop test included in the functional test is selected, and the selected loop test is executed at operation 508.

When, however, unexpected results are determined at operation 520 (i.e., the output test results do not match the known expected test results), a failed cycle identification procedure is executed at operation 526. The failed cycle identification procedure can include, for example, halting the functional test prior to fully completing the functional test, incrementing and/or decrementing the counter to adjust the clock cycle, and using pervasive control logic to identify the specific clock cycle (i.e., failing cycle) that contains the fault or unexpected result(s). At operation 528, a diagnostic pattern for the identified failed cycle is applied to the DUT and/or the supporting chip, and the previously run loop test is again executed at operation 508. In this manner, cycle failures affecting the high-speed serial link can be more easily identified, thereby improving the speed at which to remedy the failed cycle and overall chip diagnosis.

As described above, various non-limiting embodiments provide a functional testing high-speed serial link system capable of properly testing and diagnosing high-speed serial link failures, even in environments having an independent endpoint connected to the device under test (DUT). The functional testing high-speed serial link system electrically integrates a DUT with a computing supporting chip via a physical data link to form a single virtual chip. In this manner, test patterns can effectively be generated for a single integrated chip that also includes the endpoint. In addition, because the single virtual chip includes to independent physical chips, independent testing operations (e.g. start, stop, scan, etc.) can control each physical chip (i.e., the supporting chip and the DUT) independently of one another. Accordingly, the individual physical chips can be independently operated, but synchronously controlled to perform start/stop failure diagnostic operations at both ends of the physical link.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A functional testing high-speed serial link system comprising:
   a testing controller configured to generate a functional testing program;
   a device under test (DUT) in signal communication with the testing controller to receive the functional testing program, and the DUT including a first logic circuit array that generates first results in response to executing the functional testing program;
   an electronic supporting chip in signal communication with the testing controller to receive the functional testing program, the electronic supporting chip including a second logic circuit array different form the first logic circuit array that generates second results in response to executing the functional testing program; and
   a physical data link establishing signal communication directly between the DUT and the electronic supporting chip,
   wherein the testing controller diagnoses the physical data link based on a comparison between expected diagnostic results associated with the functional testing program, and at least one of the first results and the second results.

2. The functional testing high-speed serial link system of claim 1, wherein the testing controller generates a first clock signal that drives the DUT to execute the functional testing program, and a second clock signal that drives the electronic supporting chip to execute the functional testing program.

3. The functional testing high-speed serial link system of claim 2, wherein the first clock signal is generated independently from the second clock signal such that the DUT is driven independently from the electronic supporting chip.

4. The functional testing high-speed serial link system of claim 3, wherein the testing controller is configured to detect at least one faulty DUT clock cycle in response to executing the functional testing program, and halts the first clock signal in response to detecting the at least one faulty DUT clock cycle.

5. The functional testing high-speed serial link system of claim 4, wherein the testing controller halts the first clock signal at a halted position prior to fully executing the functional testing program.

6. The functional testing high-speed serial link system of claim 5, wherein the testing controller controls the clock signal to at least one of increment the first clock signal from the halted position and decrement the first clock signal from the halted position so as to identify a location of a fault in the at least one faulty DUT clock cycle.

7. The functional testing high-speed serial link system of claim 4, wherein the DUT is installed on a first test board, the electronic supporting chip is installed on a second test board, and the physical data link is an electrically conductive cable having a first end connected to a first data terminal of the DUT and a second end connected to a second data terminal of the electronic supporting chip.

8. The functional testing high-speed serial link system of claim 4, wherein the DUT and the electronic supporting chip are installed on a single common testing board, and the physical data link includes at least one electrically conductive trace integrally formed on the single common testing board, the at least one electrically conductive trace having a first end connected to a first data terminal of the DUT and a second end connected to a second data terminal of the electronic supporting chip.

9. A method for performing functional testing of high-speed serial links, the method comprising:
   generating a functional testing program to be executed by a logic circuit array;
   connecting a device under test (DUT) to an electronic supporting chip via a physical interface;
   outputting the functional testing program to the DUT that includes a first logic circuit array;
   generating first results, via the DUT, in response to executing the functional testing program by the first logic circuit array;
   outputting the functional testing program to the electronic supporting chip that includes a second logic circuit array different from the first logic circuit array;
   generating second results, via the electronic supporting chip, in response to executing the functional testing program by the second logic circuit array; and
   directly connecting the DUT and the supporting chip via physical data link; and
   diagnosing the physical data link based on a comparison between expected diagnostic results associated with the functional testing program, and at least one of the first results and the second results.

10. The method of claim 9, further comprising:
    generating a first clock signal that drives the first logic circuit array of the DUT to execute the functional testing program; and
    generating a second clock signal that drives the second logic circuit array of the electronic supporting chip to execute the functional testing program.

11. The method of claim 10, further comprising:
    generating the first clock signal is generated independently from the second clock signal; and
    using the first clock signal to drive the DUT independently from the electronic supporting chip.

12. The method of claim 11, further comprising:
    detecting at least one faulty DUT clock cycle in response to executing the functional testing program; and
    halting the first clock signal in response to detecting the at least one faulty DUT clock cycle.

13. The method of claim 12, further comprising halting the first clock signal at a halted position prior to fully executing the functional testing program.

14. The method of claim 13, further comprising at least one of incrementing and decrementing the first clock signal from the halted position so as to identify a location of a fault in the at least one faulty DUT clock cycle.

15. A computer program product to control an electronic device to compress graph data, the computer program product comprising a computer readable storage medium having program instructions embodied therewith, the program instructions executable by an electronic computer processor to control the electronic device to perform a method comprising:
    generating a functional testing program to be executed by a logic circuit array;
    connecting a device under test (DUT) to an electronic supporting chip via a physical interface;
    outputting the functional testing program to the device under test (DUT) that includes a first logic circuit array;
    generating first results, via the DUT, in response to executing the functional testing program by the first logic circuit array;

outputting the functional testing program to the electronic supporting chip that includes a second logic circuit array different from the first logic circuit array;

generating second results, via the electronic supporting chip, in response to executing the functional testing program by the second logic circuit array; and diagnosing a physical data link that directly connects the DUT and the supporting chip based on a comparison between expected diagnostic results associated with the functional testing program, and at least one of the first results and the second results.

16. The computer program product of claim 15, further comprising:

generating a first clock signal that drives the first logic circuit array of the DUT to execute the functional testing program; and generating a second clock signal that drives the second logic circuit array of the electronic supporting chip to execute the functional testing program.

17. The computer program product of claim 16 further comprising:

generating the first clock signal is generated independently from the second clock signal; and using the first clock signal to drive the DUT independently from the electronic supporting chip.

18. The computer program product of claim 17, further comprising:

detecting at least one faulty DUT clock cycle in response to executing the functional testing program; and halting the first clock signal in response to detecting the at least one faulty DUT clock cycle.

19. The computer program product of claim 18, further comprising halting the first clock signal at a halted position prior to fully executing the functional testing program.

20. The computer program product of claim 19, further comprising at least one of incrementing and decrementing the first clock signal from the halted position so as to identify a location of a fault in the at least one faulty DUT clock cycle.

* * * * *